Aug. 3, 1948.                A. H. HEINRICH                2,446,327
                       SWIVEL COUPLING FOR CONDUITS
                          Filed Oct. 15, 1945
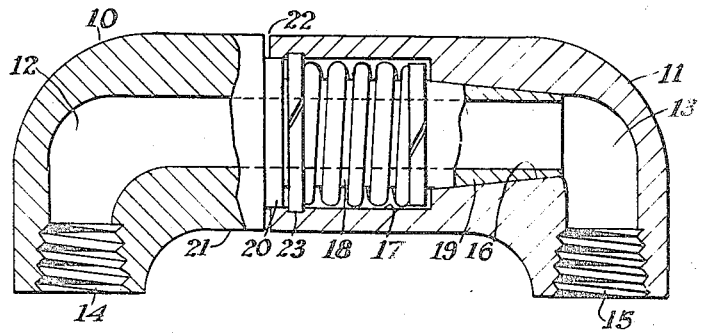
Fig. 1
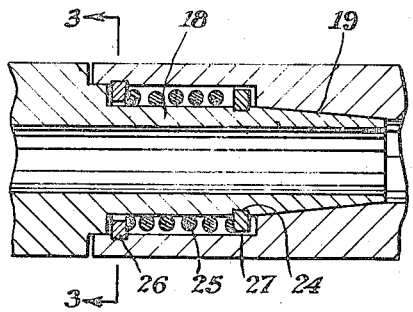
Fig. 2
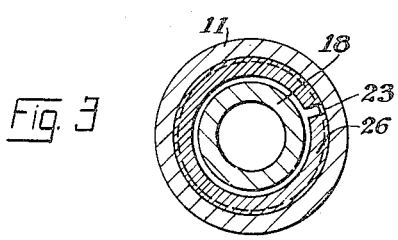
Fig. 3
Fig. 4
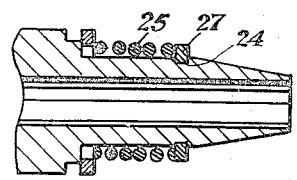
Fig. 5
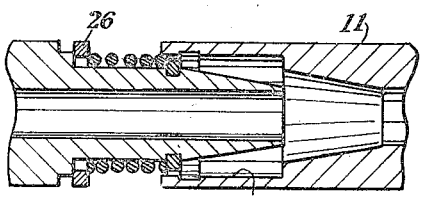
Fig. 6
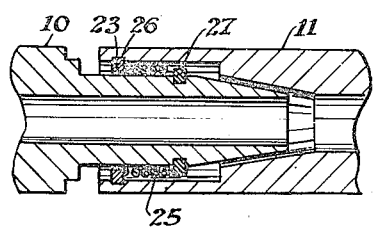
Fig. 7
*INVENTOR.*
AUGUST H. HEINRICH.
BY *Bates, Teare & McBean.*
          *Attorneys.*

Patented Aug. 3, 1948

2,446,327

UNITED STATES PATENT OFFICE 2,446,327

SWIVEL COUPLING FOR CONDUITS

August H. Heinrich, Cleveland, Ohio, assignor to Auto Diesel Piston Ring Company, Cleveland, Ohio, a corporation of Ohio Application October 15, 1945, Serial No. 622,415

4 Claims. (Cl. 285—97.6)

This invention relates to swivel joints and more particularly to a swivel pipe joint adaptable to a pipe line, electrical conduit, or the like.

There have been numerous swivel pipe joints available, but among these the ones which did not incorporate an effective fluid seal were undesirable in many applications for that reason, and those which did incorporate such a seal were too bulky or unwieldy where space was an important factor and were very often too complicated for economical manufacture and use.

An object of the present invention is to provide a swivel joint which, when contained in a pipe line, will be only slightly larger in diameter than the pipe itself and which may be easily swiveled to a desired position without impairing the leak-proof qualities of the fluid seal.

Another object is to provide such a swivel joint which will have a smooth outline or contour unmarred by protuberances of any kind, thus providing a safe design for applications where protuberances would be a source of danger or at least of annoyance, and providing a pleasing design where appearance is an important factor.

An additional object is to provide a swivel joint which will meet the above requirements in a simple and effective manner with a minimum number and complexity of parts, and hence be economical in manufacture.

Referring now to the drawings, Fig. 1 is a view partly in longitudinal section and partly in side elevation of the swivel joint of my invention; Fig. 2 is a longitudinal medial section of the parts shown in elevation in Fig. 1; Fig. 3 is a transverse section taken on a line 3—3 of Fig. 2; and Figs. 4, 5, 6 and 7 are views similar to Fig. 2 but showing successive steps in the assembly of the joint.

In the drawings I have illustrated a preferred embodiment of my invention in which 10 and 11 are male and female members, respectively, provided with internal passageways 13 and 13 in communication with each other and pipe tapped at 14 and 15, respectively. Within the female member 11, a conically tapered seat 16 is in direct communication at one end with the fluid passageway 13 and at the other end with an enlarged counterbore 17. The male member 10 is provided with a reduced cylindrical end portion 18 terminating in a conically tapered section 19, the latter being turned, lapped or honed to the desired sealing fit with the seat 16. At the inner end of the cylindrical portion 18 is a short cylindrical section 20 of greater diameter. The adjacent exposed portion of the body 10 is greater in diameter than the section 20 and preferably cylindrical for at least a portion of its length as indicated at 21. The body 11 completely houses the reduced portion of the body 10, with the outer end of the counterbore 17 riding on the cylindrical section 20. A small gap is provided at 22, between the end of the body 11 and the portion 21 of the body 10, to allow for wear and machining tolerances in the conical seal.

To maintain a fluid tight seal and mechanical rigidity to the joint, spring means are provided to urge the male and female members together. To this end an annular groove 23 is formed near the free end of the counterbore of the body 11, and an annular groove is formed on the body 10 near the junction of the tapered section 19 and the cylindrical section 18. A coil spring 25 surrounds the cylindrical portion and is under compression between an internal split ring 26 seated in the groove 23 and an external split ring 27 seated in the groove 24. It will be apparent that the action of the spring is such as to urge the tapered portions together and to maintain them in secure engagement.

It will be noted that a large degree of mechanical rigidity is imparted to the joint by reason of the widely spaced bearings at 20 and 16.

Assembly of the parts may easily be effected as illustrated in the drawings. The ring 26 is first slipped over the reduced section of the male member, as illustrated in Fig. 4, followed by the spring 25 and ring 27, the ring being snapped into the groove 24 as shown in Fig. 5. This sub-assembly is then introduced into the female member 11, as shown in Fig. 6, and at this time the ring 26 is compressed by means of an appropriate tool, not shown, until it is of a small enough diameter to slide within the counterbore 17. The tool also compresses the spring 25 and forces the ring 26 sufficiently within the counterbore to snap into the groove 23 therein, as in Fig. 7. The tool is now withdrawn, allowing the parts to assume their normal positions shown in Fig. 2.

The device, in the form illustrated, is well adapted to a large variety of applications. For example, in one type of piston-cooling system a flexible connection for the coolant is provided by means of two sections of rigid tubing pivoted at their ends to each other and to the pistons and coolant source respectively. As such a connection must necessarily be made near the connecting rod, it is imperative that the joints be of as small size as possible to avoid interference with the other moving parts. My device is admirably suited to serve at the three pivoted points mentioned.

It will be obvious that where two of my devices are placed at right angles to each other a truly universal joint results, and in this form they find a wide field of usefulness in coolant-distributing systems for machine tools where the coolant is applied by means of a nozzle at the work-engaging point. Rigid piping is found preferable to flexible conduit for such application because of its greater stability and better self-retention in adjusted position, but, because it is necessarily present at the working point, such a system is usually more or less in the operator's way and hence is a necessary nuisance. By providing swivel joints free of protuberances and of small size, my device reduces the nuisance factor to a minimum.

As an example entirely different from these, might be mentioned its usefulness in electrical equipment, such as lamp brackets. Where one of the members 10 or 11 is connected to a wall bracket, for example, and the other member carries a length of tubing as an adjustable bracket for a lamp, a very pleasing and effective result is obtained. The smooth, clean-lined exterior of my device lends itself well to modern design in this or similar applications.

It will be apparent that the bodies 10 and 11 could be straight lengths of pipe or of any other configuration beside that shown, and that the fluid passageway could be omitted where the joint is to be used with solid rods, as in a supporting bracket for a dentist tray. These and numerous other modifications may be made within the purview of my invention, the scope of which I intend to be limited only by the following claims.

I claim:

1. A swivel joint comprising male and female members and a coil spring, said male member being provided with an externally tapered conical end section followed by a cylindrical section and an annular groove between said sections adapted to receive an external split ring, said female member being provided with a conical seat engaging the conical end section and a cylindrical end portion surrounding the cylindrical section and having an annular groove adjacent the free end of the cylindrical end portion and adapted to receive an internal split ring, the said coil spring being interposed between the two split rings and adapted to maintain engagement of the conical end section and seat.

2. A swivel joint comprising male and female members and a coil spring, said male and female members being provided with fluid passageways axially aligned therewith, said male member being provided with an externally tapered conical end section followed by a cylindrical section and an annular groove between said sections adapted to receive an external split ring, said female member being provided with a conical seat engaging the conical end section and a cylindrical end portion surrounding the cylindrical section and having an annular groove adjacent the free end of the cylindrical end portion and adapted to receive an internal split ring, the said coil spring being interposed between the two split rings and adapted to maintain engagement of the conical end section and seat.

3. A swivel joint comprising axially aligned male and female members having mutually tapered coacting regions, said male member having an external shoulder and said female member having an internal groove, a resilient split ring extending about the male member and collapsible sufficient to enter the bore of the female member into radial registration with said groove, said ring being expanded by its own resilience and retaining itself in said groove, and means including a spring between said external shoulder and said ring and entirely housed within the female member adapted to urge said tapered regions together.

4. A swivel joint comprising male and female members and a coil spring, said male member being provided with an externally tapered conical end section followed by a cylindrical section and an annular groove between said sections, said female member being provided with a conical seat engaging the conical end section and a cylindrical end portion surrounding said cylindrical section, and having an annular internal shoulder adjacent the free end of the cylindrical end portion and facing the conical seat, a resilient split ring extending about the male member and retaining itself by its own resilience in place against said internal shoulder, another resilient split ring seating in the groove in the male member, the said coil spring being interposed between said split rings and adapted to maintain engagement of the conical end section and seat.

AUGUST H. HEINRICH.

REFERENCES CITED

The following references are of record in the file of this patent:

UNITED STATES PATENTS

| Number | Name | Date |
|---|---|---|
| 213,037 | Brounwell | Mar. 11, 1879 |
| 738,503 | Waters | Sept. 8, 1903 |
| 1,160,639 | Mooney | Nov. 16, 1915 |
| 2,026,167 | Guarnaschelli | Dec. 31, 1935 |